United States Patent
Kuo et al.

(10) Patent No.: US 10,546,117 B1
(45) Date of Patent: Jan. 28, 2020

(54) SYSTEMS AND METHODS FOR MANAGING SECURITY PROGRAMS

(71) Applicant: Symantec Corporation, Mountain View, CA (US)

(72) Inventors: Chengi Kuo, Manhattan Beach, CA (US); Haik Mesropian, Glendale, CA (US); David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 246 days.

(21) Appl. No.: 15/352,525

(22) Filed: Nov. 15, 2016

(51) Int. Cl.
*G06F 21/50* (2013.01)

(52) U.S. Cl.
CPC ........ *G06F 21/50* (2013.01); *G06F 2221/033* (2013.01)

(58) Field of Classification Search
CPC ............. H04L 63/1416; H04L 63/1408; H04L 63/1441; H04L 63/1458; G06F 21/50; G06F 21/552; G06F 2221/033
USPC .......................................................... 726/23
See application file for complete search history.

(56) References Cited

U.S. PATENT DOCUMENTS

| | | | | |
|---|---|---|---|---|
| 6,750,957 | B1 * | 6/2004 | Levecq ...................... | G01J 9/00 356/121 |
| 6,785,820 | B1 * | 8/2004 | Muttik ..................... | G06F 21/57 707/999.202 |
| 8,539,582 | B1 * | 9/2013 | Aziz ...................... | G06F 21/554 713/150 |
| 9,407,648 | B1 * | 8/2016 | Pavlyushchik ......... | G06F 9/544 |
| 2008/0109871 | A1 * | 5/2008 | Jacobs .................... | H04L 63/20 726/1 |
| 2013/0185799 | A1 * | 7/2013 | Pfeifer .................... | G06F 21/57 726/24 |
| 2013/0227680 | A1 * | 8/2013 | Pavlyushchik ......... | G06F 21/00 726/21 |
| 2013/0275998 | A1 * | 10/2013 | Dalcher .................. | G06F 9/542 719/318 |
| 2013/0305366 | A1 * | 11/2013 | Lim ........................ | G06F 21/56 726/23 |
| 2013/0347071 | A1 * | 12/2013 | Polo Moragon .... | H04L 63/0853 726/3 |
| 2015/0143502 | A1 * | 5/2015 | Peterson ............. | H04L 63/0245 726/11 |

(Continued)

OTHER PUBLICATIONS

Limited Periodic Scanning in Windows 10 to Provide Additional Malware Protection; https://blogs.technet.microsoft.com/mmpc/2016/05/26/limited-periodic-scanning-in-windows-10-to-provide-additional-malware-protection/; May 26, 2016.

*Primary Examiner* — Farid Homayounmehr
*Assistant Examiner* — Sanchit K Sarker
(74) *Attorney, Agent, or Firm* — FisherBroyles, LLP

(57) ABSTRACT

The disclosed computer-implemented method for managing security programs may include (i) identifying a security program configured to analyze files on a client device to detect malicious files, (ii) determining a result the security program would report for an analysis of a file on the client device, (iii) intercepting an attempt by the security program to analyze the file, and (iv) determining, based on the result the security program would report for the analysis of the file, whether to permit the security program to analyze the file. Various other methods, systems, and computer-readable media are also disclosed.

15 Claims, 6 Drawing Sheets

(56) References Cited

U.S. PATENT DOCUMENTS

| | | | |
|---|---|---|---|
| 2015/0172305 A1* | 6/2015 | Dixon | G06F 21/53 |
| | | | 726/23 |
| 2015/0222650 A1* | 8/2015 | Quinlan | H04L 63/1425 |
| | | | 726/23 |
| 2016/0292420 A1* | 10/2016 | Langton | G06F 21/53 |
| 2016/0352761 A1* | 12/2016 | McGrew | H04L 69/16 |
| 2017/0093892 A1* | 3/2017 | Prokudin | G06F 21/56 |
| 2017/0154183 A1* | 6/2017 | Cox | G06F 21/552 |

* cited by examiner

SYSTEMS AND METHODS FOR MANAGING SECURITY PROGRAMS

BACKGROUND

Security programs have become a standard tool in protecting computing systems and the data they access. Security programs analyze programs and files stored on, accessed, or executed by computing systems for potentially malicious or destructive actions. It is not unusual for a computing system to have more than one security program installed. A consumer may purchase a laptop with a security program installed, then install another security program they are familiar with or prefer. An organization's IT department may have a standard security program that is required for all devices and managed centrally, but individual users may install additional security programs to provide additional security or just as a matter of preference.

However, having multiple security programs installed on a single computing device may create problems. Every security program may incorrectly identify a benign file as malicious. Having multiple security programs analyzing the same files multiplies the potential for false positive malware identifications. Repeatedly analyzing files known to be benign can also unnecessarily degrade system performance. The instant disclosure, therefore, identifies and addresses a need for systems and methods for managing security programs.

SUMMARY

As will be described in greater detail below, the instant disclosure describes various systems and methods for managing security programs.

In one example, a computer-implemented method for managing security programs may include (i) identifying a security program configured to analyze files on a client device to detect malicious files, (ii) determining a result the security program would report for an analysis of a file on the client device, (iii) intercepting an attempt by the security program to analyze the file, and (iv) determining, based on the result the security program would report for the analysis of the file, whether to permit the security program to analyze the file.

In one embodiment, to prevent a false positive identification of the file as being malicious, the computer-implemented method does not permit the security program to analyze the file because the security program would report that the file is malicious, and the file is known to be benign. In one embodiment, the file is known to be benign because the file has not been modified since a previous security analysis determined that the file is benign. In one embodiment, the file is known to be benign because the file has a benign file type. In one embodiment, the file is known to be benign because the file was digitally signed by a trusted party. In one embodiment, the file is known to be benign because the file was previously determined to have a good reputation.

In some examples, determining the result the security program would report for the analysis of the file may include submitting the file for analysis by the security program. In some examples, determining the result the security program would report for the analysis of the file may include retrieving, from a database of results of file analyses by the security program, a result of a previous analysis of the file.

In one embodiment, a system for implementing the above-described method may include several modules stored in memory, such as an identification module that identifies a security program configured to analyze files on a client device to detect malicious files, an analysis module that determines a result the security program would report for an analysis of a file on the client device, an interception module that intercepts an attempt by the security program to analyze the file, and a control module that determines, based on the result the security program would report for the analysis of the file, whether to permit the security program to analyze the file. The system may also include at least one physical processor configured to execute the identification module, the analysis module, the interception module, and the control module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a security program configured to analyze files on a client device to detect malicious files, (ii) determine a result the security program would report for an analysis of a file on the client device, (iii) intercept an attempt by the security program to analyze the file, and (iv) determine, based on the result the security program would report for the analysis of the file, whether to permit the security program to analyze the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
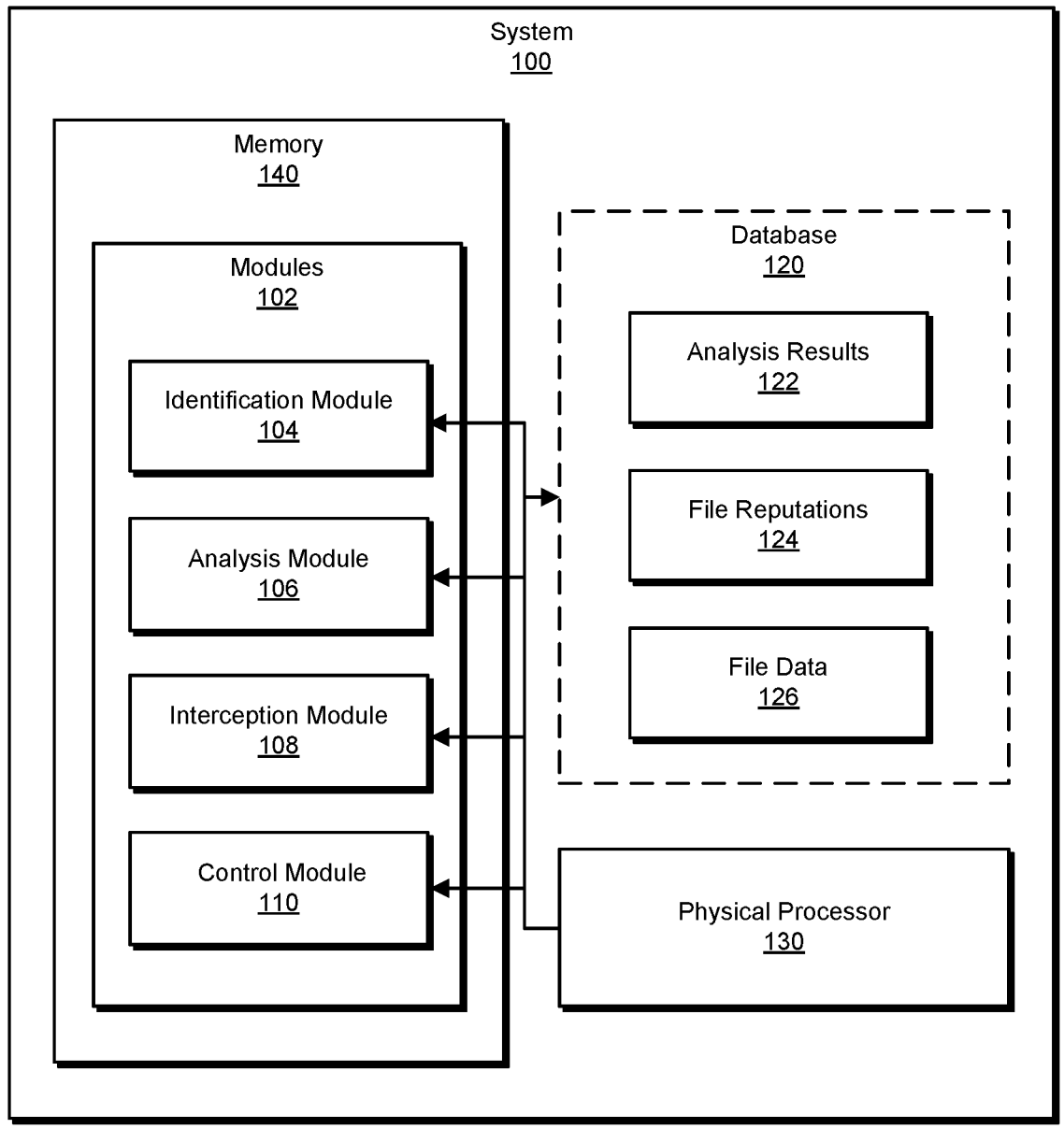
FIG. 1 is a block diagram of an example system for managing security programs.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing security programs. As will be explained in greater detail below, by determining the result a security program would report for analysis of a file on a client device, the systems and methods described herein may determine whether to permit the security program to analyze the file. By doing so, the systems and methods described herein may correlate file analysis actions between security programs running on a client device and avoid false positive file analysis results.

In addition, the systems and methods described herein may improve the functioning of a computing device by eliminating redundant file analyses that may degrade device performance without reducing the level of data security on the device. These systems and methods may also improve the field of computer security by coordinating the actions of multiple security programs executing on individual computing devices.

Figure 2:
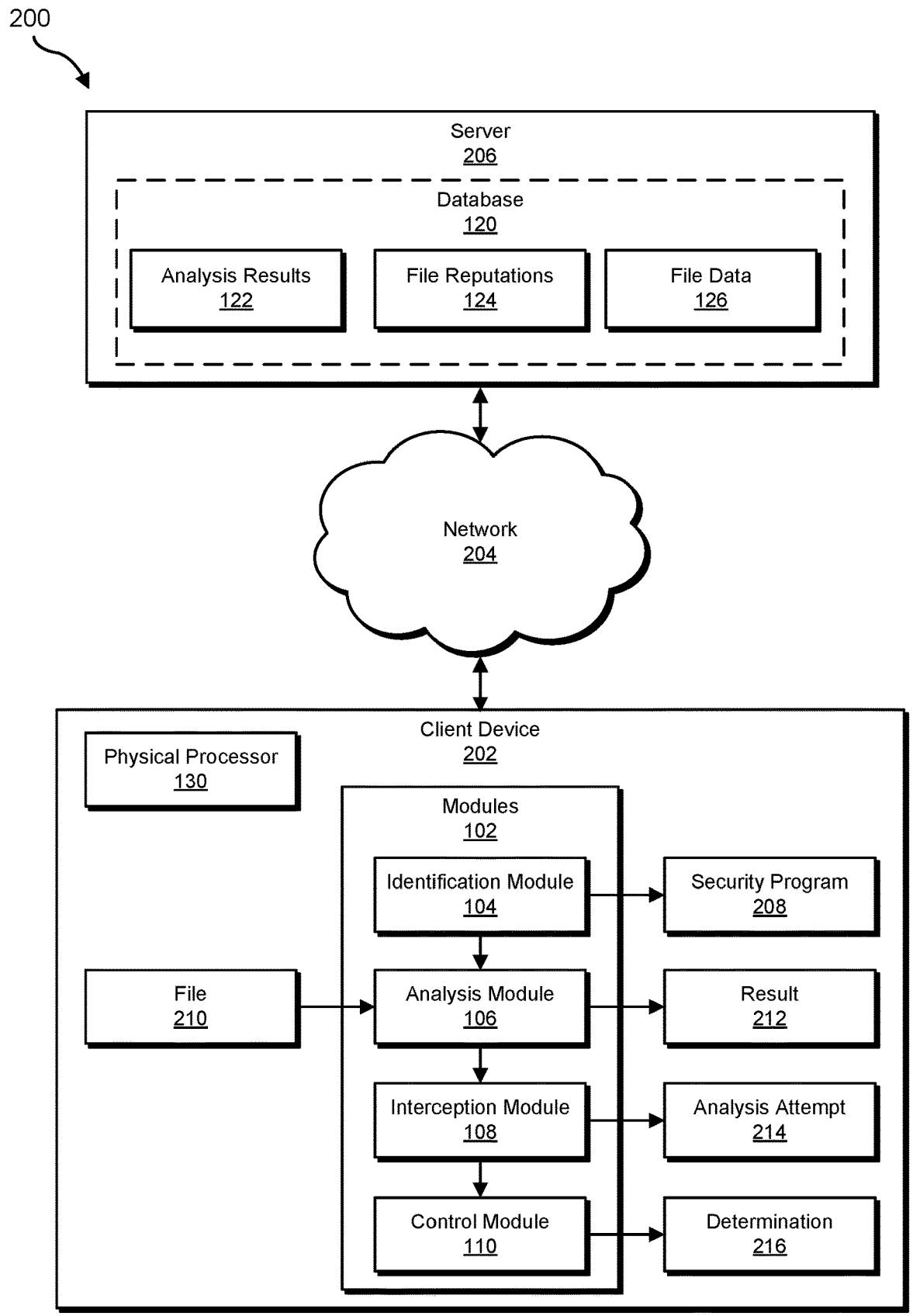
FIG. 2 is a block diagram of an additional example system for managing security programs.
Figure 3:
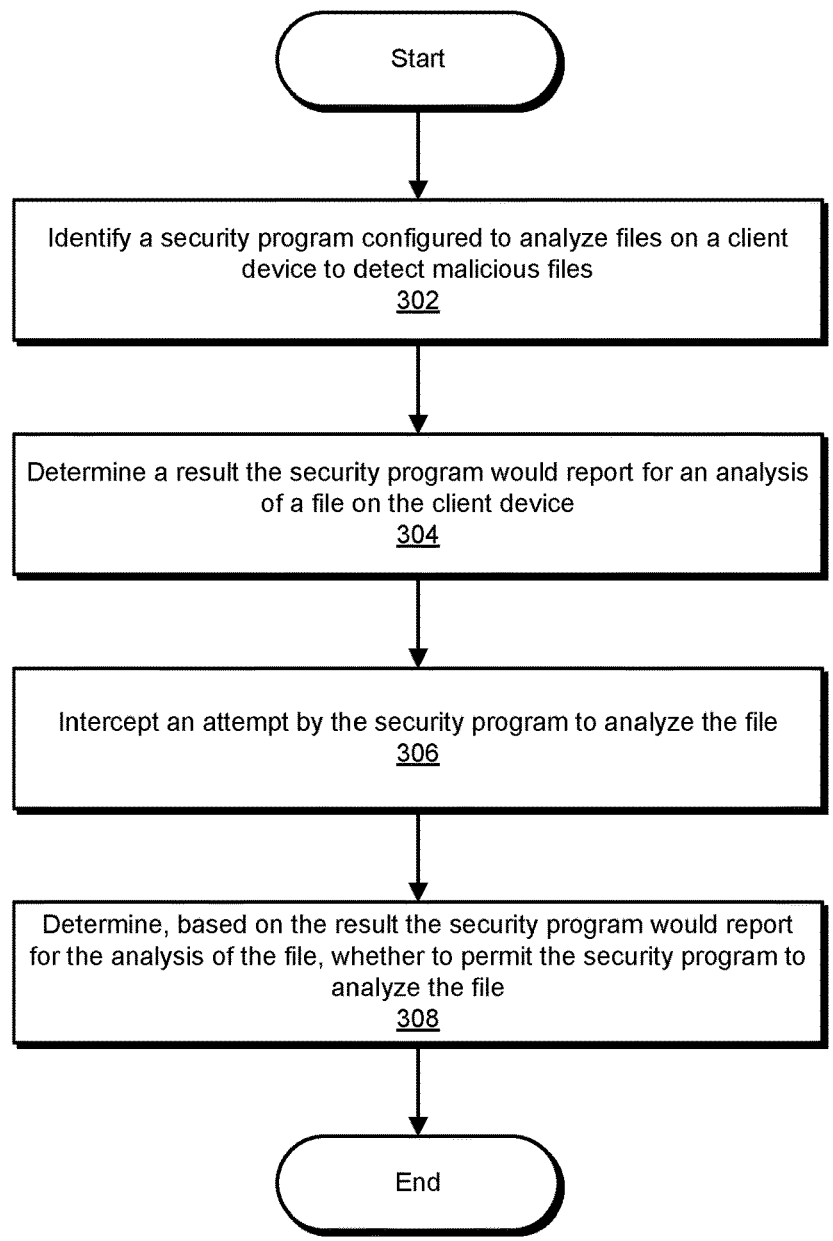
FIG. 3 is a flow diagram of an example method for managing security programs.
Figure 4:
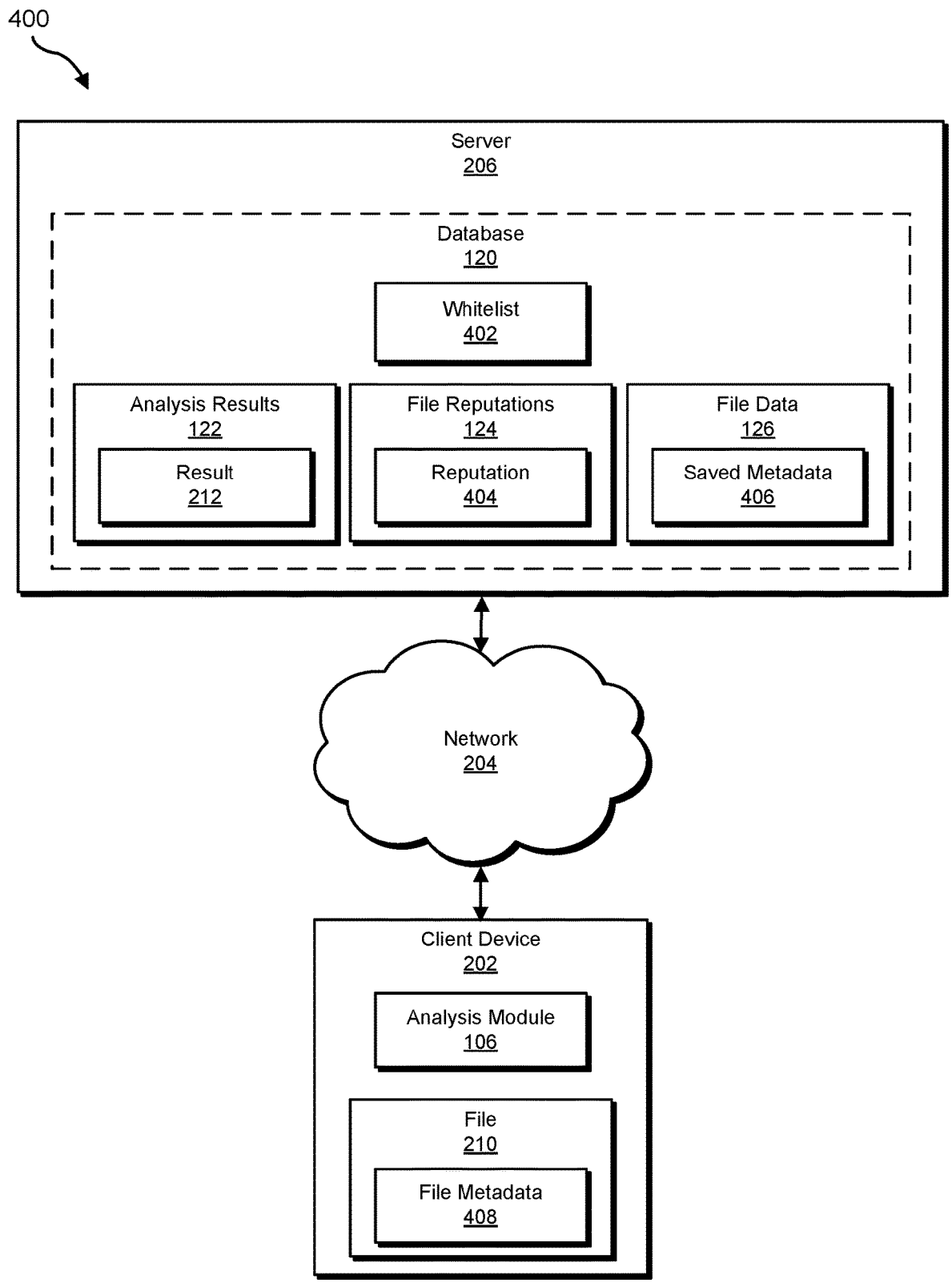
FIG. 4 is a block diagram of an exemplary computing system for managing security programs.

The following will provide, with reference to FIGS. 1, 2, and 4 detailed descriptions of example systems for managing security programs. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of exemplary system 100 for managing security programs. As illustrated in this figure, exemplary system 100 may include one or more modules 102 for performing one or more tasks. For example, and as will be explained in greater detail below, exemplary system 100 may include an identification module 104 that identifies a security program configured to analyze files on a client device to detect malicious files. Exemplary system 100 may additionally include an analysis module 106 that determines a result the security program would report for an analysis of a file on the client device. Exemplary system 100 may also include an interception module 108 that intercepts an attempt by the security program to analyze the file. Exemplary system 100 may additionally include a control module 110 that determines, based on the result the security program would report for the analysis of the file, whether to permit the security program to analyze the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing security programs. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store results of security scan analyses of files, file reputation data, and/or file metadata. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Example system 100 in FIG. 1 may be implemented in a variety of ways. For example, all or a portion of example system 100 may represent portions of example system 200 in FIG. 2. As shown in FIG. 2, system 200 may include a client device 202 in communication with a server 206 via a network 204. In one example, all or a portion of the functionality of modules 102 may be performed by client device 202, server 206, and/or any other suitable computing system. As will be described in greater detail below, one or more of modules 102 from FIG. 1 may, when executed by at least one processor of client device 202 and/or server 206, enable client device 202 and/or server 206 to manage security programs. For example, and as will be described in greater detail below, one or more of modules 102 may cause client device 202 and/or server 206 to managing security programs. For example, and as will be described in greater detail below, identification module 104 may identify a security program 208 configured to analyze files on a client device to detect malicious files. Analysis module 106 may determine a result security program 208 would report for an analysis of a file 210 on the client device. Interception module 108 may intercept an attempt by security program 208 to analyze file 210. Control module 110 may determine, based on the result security program 208 would report for the analysis of file 210, whether to permit security program 208 to analyze file 210.

Client device 202 generally represents any type or form of computing device capable of reading computer-executable instructions. In one embodiment, client device 202 may represent an endpoint device running client-side security software. Additional examples of client device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of receiving, comparing, storing, and transmitting data. In one embodiment, server 206 may represent a backend security server configured to store whitelists, exclusion lists, security scan analysis results, file reputation data, and/or file metadata. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between client device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for managing security programs. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a security program configured to analyze files on a client device to detect malicious files. For example, identification module 104 may, as part of client device 202 in FIG. 2, identify security program 208 configured to analyze files on a client device to detect malicious files.

The term "security program," as used herein, generally refers to any type or form of software, application, or executable code dedicated to protecting a computing device against malware, viruses, intrusions, unsecure network connections, and/or any additional security threat. In some examples, a security program may run in the background of a computing device to detect and prevent attempts by the computing device to access potentially harmful computing resources (e.g., malicious files and websites). Furthermore, a security program on an endpoint device may be in communication with and/or managed by a central security server or database. The central server may assist the security program in protecting the endpoint device in a variety of ways, such as by providing information about the reputation of files accessed by the endpoint device and/or enforcing security policies on the endpoint device.

Identification module 104 may identify security program 208 in a variety of ways. For example, identification module 104 may search the processes executing on client device 202 for known security programs. In another example, identification module 104 may identify security program 208 by identifying programs that have hooked or intercepted operating system and/or file system application programming interfaces (APIs) typically used to analyze network data or files as they are received, stored, and/or opened.

As used herein, the terms "hooking" and "intercepting" generally refer to the practice of diverting, or otherwise modifying, the functionality of a computing program to thereby arrest the function of the program and enable a security program to perform additional functionality, such as program behavior and function call analysis, as discussed further below. In some examples, hooking an application programming interface call may include triggering an exception. In further examples, hooking the application programming interface call may include redirecting function calls, modifying or replacing function calls, and/or inserting new or additional function calls and/or program code, beyond the original function calls and code of the unmodified program. Notably, as used herein, the term "hooked application programming interface call" generally refers to the modified or unmodified call command after the performance of the hooking functionality.

At step 304, one or more of the systems described herein may determine a result the security program would report for an analysis of a file on the client device. For example, analysis module 106 may, as part of client device 202 in FIG. 2, determine result 212 that security program 208 would report for an analysis of file 210 on client device 202.

The term "analysis," as used herein, generally refers to any examination and/or observation of the contents of a file, database, or data structure, or the behavior, action, outcome, or result produced by the execution of a file, script, or other form of executable instructions to determine whether the object of the analysis represents a potential threat to a computing system or to data stored on the system. An analysis may include, without limitation, scanning a file for any fingerprint, hash, defined pattern, characteristic of malware and/or a variant, family, or strain of malware. Additionally or alternatively, an analysis may include inspection or observation of executable code to identify potential threats. An analysis may also include querying a database to obtain a reputation for a file.

Analysis module 106 may determine a result security program 208 would report for an analysis of file 210 in a variety of ways. For example, analysis module 106 may determine the result 212 security program 208 would report for an analysis of file 210 by submitting file 210 for analysis by security program 208. In one example, analysis module 106 may provide file 210 to an API of security program 208 that performs an analysis of file 210 and returns result 212. Result 212 may represent a report or value indicating whether the analysis indicates a threat level for the object of the analysis. For example, result 212 may indicate whether file 210 is known to be malicious, known to be benign, is suspicious, or if the threat level cannot be determined. In another example, analysis module 106 may determine the result 212 security program 208 would report for an analysis of file 210 by providing file 210 to a command-line interface of security program 208 and receiving result 212 in a file or other output from security program 208.

In some examples, analysis module 106 may determine the result the security program would report for the analysis of the file by retrieving, from a database of results of file analyses by the security program, a result of a previous analysis of the file. For example, analysis module 106 may calculate a hash value that identifies the file and use the hash value to query a database of file analysis results to obtain a result of a previous analysis of the file. As shown in FIG. 2, analysis results 122 may be stored in database 120 on server 206. The previous analysis may have been obtained by analysis module 106 executing on client device 202, or from another instance of security program 208 executing on a different computing device.

At step 306, one or more of the systems described herein may intercept an attempt by the security program to analyze the file. For example, interception module 108 may, as part of client device 202 in FIG. 2, intercept analysis attempt 214 by security program 208 to analyze file 210.

Interception module 108 may intercept the attempt to analyze the file in a variety of ways. For example, interception module 108 may use information obtained by identification module 104 in step 302 to divert one or more API hooks security program 208 has installed to enable it to analyze files or other data as they are received, stored, and/or opened. In some examples, the operating system of client device 202 may provide documented interfaces for developing file system filter drivers that extend or replace the functionality of file system APIs that read or write files.

At step 308, one or more of the systems described herein may determine, based on the result the security program would report for the analysis of the file, whether to permit the security program to analyze the file. For example, control module 110 may, as part of client device 202 in FIG. 2, determine, based on result 212 security program 208 would report for an analysis of file 210, whether to permit security program 208 to analyze file 210.

Control module 110 may determine whether to permit security program 208 to analyze file 210 in a variety of ways. Examples of how control module 110 may determine whether to permit security program 208 to analyze file 210 may be illustrated in conjunction with FIG. 4, which is a block diagram of an exemplary computing system 400 for managing security programs. Exemplary computing system 400 may include control module 110 executing on client device 202, which is in communication with server 206 via network 204. Client device 202 may also include file 210 with file metadata 408. Server 206 may include database 120 with whitelist 402 and file analysis results 122, which may include result 122. Server 206 may also include file reputations 124, which may include reputation 404, and file data 126, which may include saved metadata 406.

Control module 110 may determine, for example, that analysis module 106 determined in step 304 of FIG. 3 that security program 208 reported after performing an analysis of file 210 that file 210 is benign. Control module 110 may then determine that because security program 208 previously determined that file 210 is benign, permitting security program 208 to repeat an analysis of file 210 would represent an unproductive use of computing resources.

Analysis module 106 may determine that security program 208 would determine that file 210 is benign in a variety of ways. In one embodiment, file 210 is known to be benign because the file has not been modified since a previous security analysis determined that the file is benign. Analysis module 106 may, for example, compare the last modified timestamp and a hash value for file 210 with the date and time of the last security analysis of the file and a hash value calculated for the file at the time of the last security analysis. For example, as shown in FIG. 4, analysis module 106 may obtain the last modified timestamp and hash value for file 210 from saved metadata 406 in a table of file data 126 stored in database 120 on server 206. If saved metadata 406 indicates that file 210 has not been modified since the last security analysis, control module 110 may then determine that result 212 in a table of analysis results 122 in database 120 on server 206 indicates that security program 208 determined in the previous security analysis that file 210 is benign. Control module 110 may determine that repeating the security analysis on file 210 would again determine that file 210 is benign, and therefore repeating the security analysis would be unproductive.

In one embodiment, the file is known to be benign because the file has a benign file type. For example, files that are not executed or do not contain executable code, such as text files, may be considered benign due to their file type. Although it is conceivable that a text file may contain a malicious script, text files are typically not executed unless they are first converted to another file type. Analysis module 106 may determine that security program 208 would indicate that file 210 is benign because file 210 has a benign file type. Control module 110 may determine that because file 210 has a benign file type, security program 208 would determine that file 210 is benign and therefore security program 208 should not be permitted to perform a security analysis of file 210.

In one embodiment, the file is known to be benign because the file was digitally signed by a trusted party. For example, a program file may include a code signing certificate from a recognized certificate authority and a digital signature that can be used to verify that the file has not been modified since it was created. Analysis module 106 may determine that, due to the presence of the code signing certificate, security program 208 would determine that file 210 is benign. Control module 110 may determine that because the presence of a code signing certificate indicates that file 210 is benign, security program 208 would determine that file 210 is benign and therefor security program 208 should not be permitted to perform a security analysis of file 210.

In one embodiment, the file is known to be benign because the file was previously determined to have a good reputation. The term "reputation," as used herein, generally refers to an indication of the trustworthiness, prevalence, prominence, and/or community opinion of a file. A reputation may be based on a variety of factors, such as the percentage of devices or number of devices on which the file occurs (e.g., the prevalence of a software program in a wide area network, on the Internet, and/or on devices and networks outside a local network, etc.), the length of time the file has been present on one or more devices, an indication of the reliability of the publisher or developer of the file, an indication of the likelihood that the file may contain malware, a community rating of the file, an evaluation of the file by a trusted entity, and/or any other suitable factor. A file's reputation may be expressed by a numerical score or by a rating, such as "good," "bad," or "unknown."

Analysis module 106 may determine and maintain a file's reputation in a variety of ways. For example, analysis module 106 may query a reputation service using a calculated hash value identifying the file to obtain the file's reputation. In another example, analysis module 106 may make an assessment of the file's reputation based on the file's prevalence and the length of time present in a set of computing devices. Analysis module 106 may maintain a list or database of files with good reputations to be referenced in subsequent file analyses. For example, as shown in FIG. 4, analysis module 106 may maintain reputation 404 for file 210 in a table of file reputations 124 in database 120 on server 206. Control module 110 may determine that because file 210 has a good reputation, security program 208 would determine that file 210 is benign and therefore security program 208 should not be permitted to perform a security analysis of file 210.

In one embodiment, to prevent a false positive identification of the file as being malicious, the computer-implemented method does not permit the security program to analyze the file because the security program would report that the file is malicious, and the file is known to be benign. For example, as shown in FIG. 4, Analysis module 106 may determine by querying database 120 to obtain result 212 of a previous analysis of file 210 by security program 208, that security program 208 previously identified file 210 as malicious. However, because whitelist 402 identifies file 210 as benign, control module 110 may determine that, to avoid a false positive result, security program 208 should not be permitted to perform a security analysis of file 210. In some examples, whitelist 402 may include system administration tools, diagnostic tools port scanners, network sniffers, forensic tools, remote access tools, file sharing tools, or any other programs or files that a user may use for legitimate purposes, but which security program 208 may identify as malicious. In one example, whitelist 402 may indicate that all files in a particular folder or subdirectory should not be subjected to security analysis by security program 208.

As explained above in connection with example method 300 in FIG. 3, the systems and methods described herein may propagate settings from a security program to one or more additional security programs executing on a client device. The propagated settings may include whitelists, exclusion lists, and/or options selected to improve system efficiency. Coordinating the analysis actions of multiple security programs may decrease the number of false positive analysis results.

Normally, when a file is in a security program's whitelist, the program allows access to the file. If the systems and methods described herein determine that the process attempting to open a file is another security program, the primary security program may prevent the secondary security program from accessing the file. The primary security program has effectively enforced an exclusion on the file onto the secondary security program. Forms of exclusions may include hash value exclusions or file type exclusions (such as for known uninfectable files).

Systems and methods described herein may prevent false positive file analysis results by determining the analysis result a secondary security program may report for a file. For example, a secondary security program may provide an API or command-line interface for analyzing a file. A primary security program may obtain and catalogue the results of file analyses by a secondary security program and use the catalogued results to determine whether to permit the secondary security program to perform subsequent file analyses. If the primary security program determines that a secondary security program will report that a file is malicious, but through its own reputation system determines that the file is known to be benign, the primary security program may later prevent the secondary security program from analyzing the file and producing a false positive analysis result.

Finally, the systems and methods described herein may improve the efficiency of security program operations by excluding from analysis by secondary security programs files with a known high reputation, files with a code signing certificate from a trusted party, or files known not to have changed since a previous analysis. The systems and methods described herein may elect to make additional functional selections on the basis of performance. For example, a primary security program may prevent a secondary security program from performing a security analysis of files in a compressed archive until files in the archive are decompressed to be written or executed.

Figure 5:
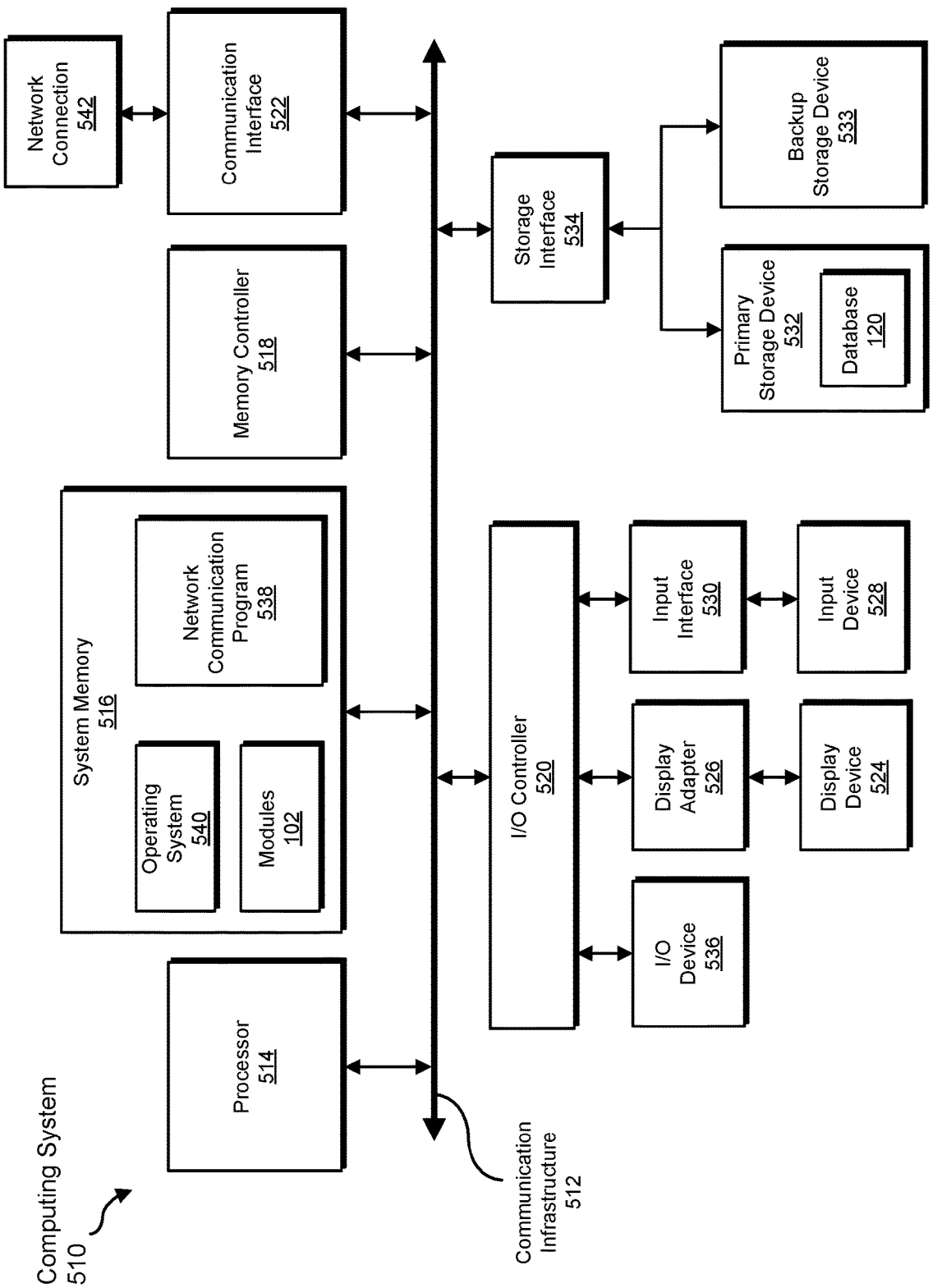
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
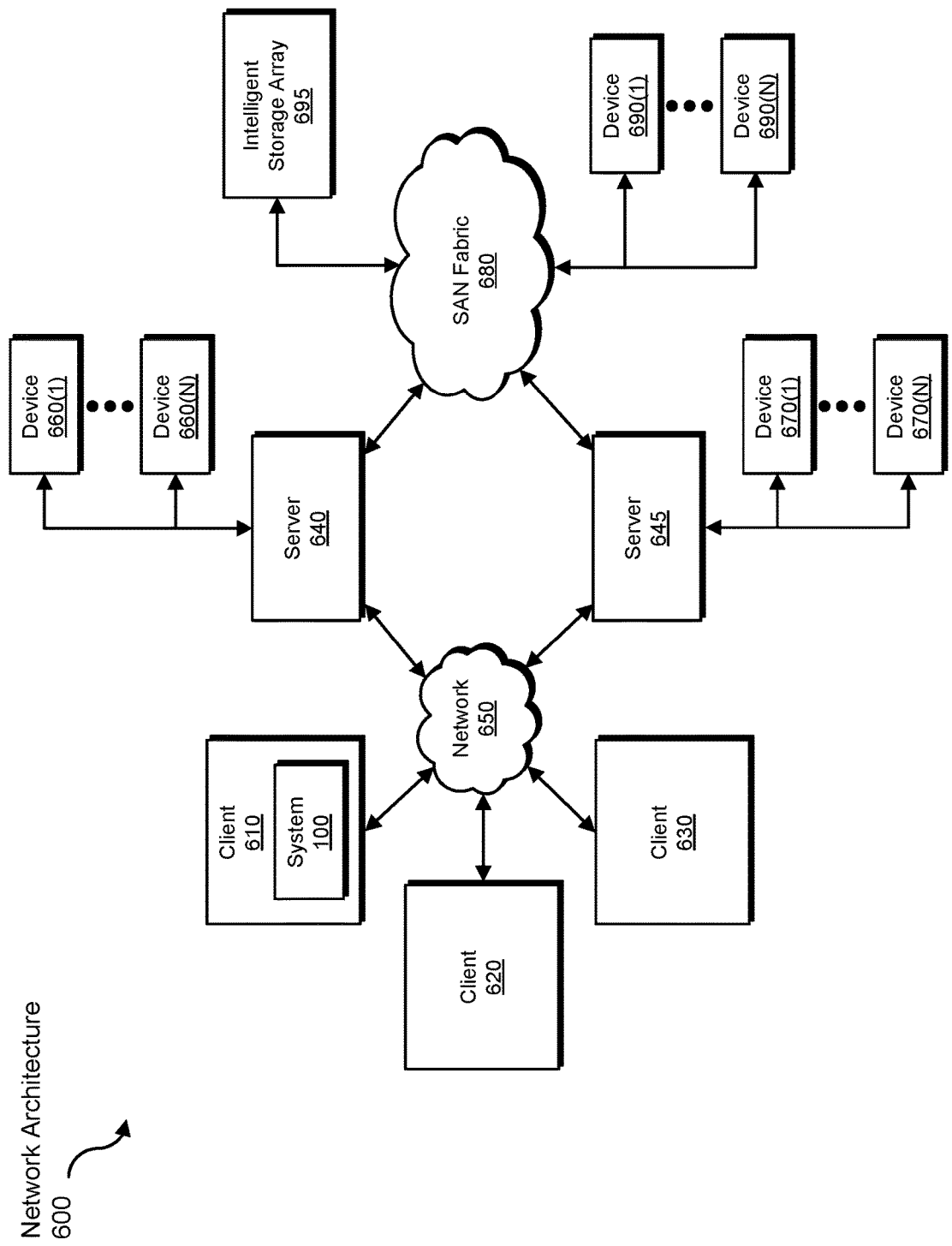
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for managing security programs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive security program analysis results to be transformed, transform the security program analysis results, output a result of the transformation to determine whether files should be analyzed by the security program, use the result of the transformation to manage the security program, and store the result of the transformation to manage future security program analyses. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing security programs, at least a portion of the method being performed by a computing device comprising at least one processor, the method comprising:
   identifying a security program configured to analyze files on a client device to detect malicious files;
   determining a result the security program would report for an analysis of a file on the client device, wherein determining the result the security program would report comprises submitting the file for analysis by the security program;
   intercepting an attempt by the security program to analyze the file; and
   determining, based on the result the security program would report for the analysis of the file and based on stored data indicating whether the file is known to be benign, whether to permit the security program to analyze the file, wherein a file that is known to be benign is not malicious;
   wherein, based on the result the security program would report is that the file is malicious, and based on the stored data indicating that the file is known to be benign, the security program is not permitted to analyze the file to prevent a false positive identification of the file as being malicious.

2. The computer-implemented method of claim 1, wherein the file is known to be benign because the stored data comprises file analysis results and file metadata that indicate the file has not been modified since a previous security analysis determined that the file is benign.

3. The computer-implemented method of claim 1, wherein the file is known to be benign because the stored data comprises file metadata that indicates the file has a benign file type.

4. The computer-implemented method of claim 1, wherein the file is known to be benign because the stored data comprises file metadata that indicates the file was digitally signed by a trusted party.

5. The computer-implemented method of claim 1, wherein the file is known to be benign because the stored data comprises file reputation data that indicates the file was previously determined to have a good reputation.

6. The computer-implemented method of claim 1, wherein determining the result the security program would report for the analysis of the file comprises retrieving, from a database of results of file analyses by the security program, a result of a previous analysis of the file.

7. A system for managing security programs, the system comprising:
   an identification module, stored in memory, that identifies a security program configured to analyze files on a client device to detect malicious files;
   an analysis module, stored in memory, that determines a result the security program would report for an analysis of a file on the client device, wherein determining the result the security program would report comprises submitting the file for analysis by the security program;
   an interception module, stored in memory, that intercepts an attempt by the security program to analyze the file;
   a control module, stored in memory, that determines, based on the result the security program would report for the analysis of the file and based on stored data indicating whether the file is known to be benign, whether to permit the security program to analyze the file, wherein a file that is known to be benign is not malicious; and
   at least one physical processor configured to execute the identification module, the analysis module, the interception module, and the control module;
   wherein, based on the analysis module determining that the security program would report that the file is malicious, and based on the stored data indicating that the file is known to be benign, the control module does not permit the security program to analyze the file to prevent a false positive identification of the file as being malicious.

8. The system of claim 7, wherein the analysis module determines that the file is known to be benign because the stored data comprises file analysis results and file metadata that indicate the file has not been modified since a previous security analysis determined that the file is benign.

9. The system of claim 7, wherein the analysis module determines that the file is known to be benign because the stored data comprises file metadata that indicates the file has a benign file type.

10. The system of claim 7, wherein the analysis module determines that the file is known to be benign because the stored data comprises file metadata that indicates the file was digitally signed by a trusted party.

11. The system of claim 7, wherein the analysis module determines that the file is known to be benign because the stored data comprises file reputation data that indicates the file was previously determined to have a good reputation.

12. The system of claim 7, wherein determining the result the security program would report for the analysis of the file comprises retrieving, from a database of results of file analyses by the security program, a result of a previous analysis of the file.

13. A non-transitory computer-readable medium comprising one or more computer-readable instructions that, when executed by at least one processor of a computing device, cause the computing device to:
   identify a security program configured to analyze files on a client device to detect malicious files;
   determine a result the security program would report for an analysis of a file on the client device, wherein determining the result the security program would report comprises submitting the file for analysis by the security program;
   intercept an attempt by the security program to analyze the file; and
   determine, based on the result the security program would report for the analysis of the file and based on stored data indicating whether the file is known to be benign, whether to permit the security program to analyze the file, wherein a file that is known to be benign is not malicious;
   wherein, based on the result the security program would report is that the file is malicious, and based on the stored data indicating that the file is known to be benign, the security program is not permitted to analyze the file to prevent a false positive identification of the file as being malicious.

14. The non-transitory computer-readable medium of claim 13, wherein the one or more computer-readable instructions cause the computing device to determine that the file is known to be benign because the stored data comprises file analysis results and file metadata that indicate the file has not been modified since a previous security analysis determined that the file is benign.

15. The non-transitory computer-readable medium of claim 13, wherein the one or more computer-readable instructions cause the computing device to determine that the file is known to be benign because the stored data comprises file metadata that indicates the file has a benign file type.

* * * * *